United States Patent
Diehl

(10) Patent No.: US 8,256,011 B2
(45) Date of Patent: Aug. 28, 2012

(54) MEDIA PACKAGE, SYSTEM COMPRISING A MEDIA PACKAGE AND METHOD OF EXECUTING PROGRAM CODE

(75) Inventor: Eric Diehl, Liffre (FR)

(73) Assignee: Thomson Licensing, Boulogne, Bilancourt (FR)

( * ) Notice: Subject to any disclaimer, the term of this patent is extended or adjusted under 35 U.S.C. 154(b) by 140 days.

(21) Appl. No.: 12/450,864

(22) PCT Filed: Apr. 18, 2008

(86) PCT No.: PCT/EP2008/054761
§ 371 (c)(1),
(2), (4) Date: Mar. 11, 2010

(87) PCT Pub. No.: WO2008/129009
PCT Pub. Date: Oct. 30, 2008

(65) Prior Publication Data
US 2010/0192231 A1    Jul. 29, 2010

(30) Foreign Application Priority Data
Apr. 19, 2007  (EP) .................................. 07300965

(51) Int. Cl.
*H04L 29/06* (2006.01)
*H04L 9/32* (2006.01)
(52) U.S. Cl. ........................ 726/27; 713/170; 713/173
(58) Field of Classification Search ........... 713/150–194
See application file for complete search history.

(56) References Cited

U.S. PATENT DOCUMENTS

| | | | |
|---|---|---|---|
| 2002/0120847 A1* | 8/2002 | Kamperman | 713/170 |
| 2003/0217271 A1* | 11/2003 | Calder | 713/173 |
| 2005/0010805 A1* | 1/2005 | Jascau et al. | 713/200 |
| 2005/0109841 A1* | 5/2005 | Ryan et al. | 235/380 |
| 2006/0195840 A1* | 8/2006 | Sundarrajan et al. | 717/176 |

FOREIGN PATENT DOCUMENTS

| | | |
|---|---|---|
| EP | 1598815 | 11/2005 |
| EP | 1780709 | 5/2007 |
| WO | WO 00/23994 | 4/2000 |

OTHER PUBLICATIONS

Search Report Dated Jul. 22, 2008.

* cited by examiner

*Primary Examiner* — Shin-Hon Chen
(74) *Attorney, Agent, or Firm* — Jeffrey D. Carter

(57) ABSTRACT

A media package storing program code, the media package comprising a medium storing a first part of the program code intended to be executed on a processor external to the media package, and a processing device storing a state and a second part of the program code, the first and the second parts of the program code being adapted to interact when executed so as to execute the program code. The processing device comprises a processor for verifying the state and for executing the second part of the program code if the verification of the state indicates that this is authorized; and a first interface for communication with the processor external to the media package. The processing device further comprises a second interface adapted to interact with a state change device in order to set the state from a first state not authorizing execution of second part of the program code to a second state authorizing execution of second part of the program code. The second interface is a Radio Frequency interface adapted to, when the media package is in the first state, interact with at least one anti-theft portal. Also provided is a system.

6 Claims, 3 Drawing Sheets

MEDIA PACKAGE, SYSTEM COMPRISING A MEDIA PACKAGE AND METHOD OF EXECUTING PROGRAM CODE

This application claims the benefit, under 35 U.S.C. §365 of International Application PCT/EP2008/054761, filed Apr. 18, 2008, which was published in accordance with PCT Article 21(2) on Oct. 30, 2008 in English and which claims the benefit of European patent application No. 07300965.6, filed on Apr. 19, 2007.

FIELD OF THE INVENTION

The invention is generally directed to digital content protection, and more specifically to protection of digital content on pre-recorded media.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Digital content, such as computer games on a DVD, that hereinafter will be used as an example, is very coveted, for example by pirates who wish to copy and disseminate it, usually for financial gain. On a smaller scale, such computer games are often stolen by persons who may think that they are too expensive to buy.

Naturally, copy protection of pre-recorded media is a field that has been extensively explored exploiting techniques as diverse as for example encryption (Advanced Access Content System, AACS, and Content Scrambling System, CSS), non-standard layouts, and introduction of errors for anti-ripping solutions. However, these techniques remain static and are therefore not likely to withstand piracy in the long run. Other approaches, such as for example Self Protected Digital Content (Kocher P., et al., Cryptography Research 2002) introduce a modicum of renewability.

The most promising solution seems to be the combination of an active component and the static medium, in which the active component participates to the copy protection system. One such solution is the use of so-called dongles that must be connected to the computer for a specific hardware to run properly.

At the same time, Radio Frequency Identity (RFID) tags are already employed in anti-theft systems. A tag detector portal spots attempts to pass through with an active tag, but this kind of systems may relatively easily be circumvented.

It can thus be appreciated that there is a need for a solution that improves the copy protection of the art.

The present invention provides such a solution.

SUMMARY OF THE INVENTION

In a first aspect, the invention is directed to a media package storing program code. The media package comprises a medium storing a first part of the program code intended to be executed on a processor external to the media package, and a processing device storing a state and a second part of the program code, the first and the second parts of the program code being adapted to interact when executed so as to execute the program code. The processing device comprises means for verifying the state; means for executing the second part of the program code if the verification of the state indicates that this is authorised; and means for communication with the processor external to the media package. The processing device further comprises an interface adapted to interact with a state change device in order to set the state from a first state not authorising execution of second part of the program code to a second state authorising execution of second part of the program code.

In a first preferred embodiment, the media package in the first state is adapted to interact with at least one anti-theft portal.

In a second preferred embodiment, the processing device further comprises means for authenticating the state change device.

In a third preferred embodiment, the interface is a Radio Frequency (RF) interface.

In a fourth preferred embodiment, the medium comprises the processing device.

In a second aspect, the invention is directed to a system comprising a media package of the first aspect, a state change device, and a server adapted to authenticate the state change device. The state change device is adapted to change the state only upon successful authentication.

In a preferred embodiment, the server is further adapted to, upon successful authentication, send the second part of the program code to the state change device for transfer to the processing device. It is advantageous that the server is further adapted to verify if the processing device has been revoked before sending the second part of the program code.

In a third aspect, the invention is directed to a method of executing program code of which a first part is stored on a medium and a second part is stored in a processing device. A processor executes functions of the first part of the program code and communicates with the processing device to request execution of at least one function of the second part of the program code. The processing device verifies that its state is equal to a first value. In case of positive verification, the processing device executes at least one function of the second part of the program code; and communicates with the processor to inform the processor that the at least one function of the second part of the program code has been executed.

In a preferred embodiment, the processing device further returns at least one calculated value to the processor.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

Figure 1:
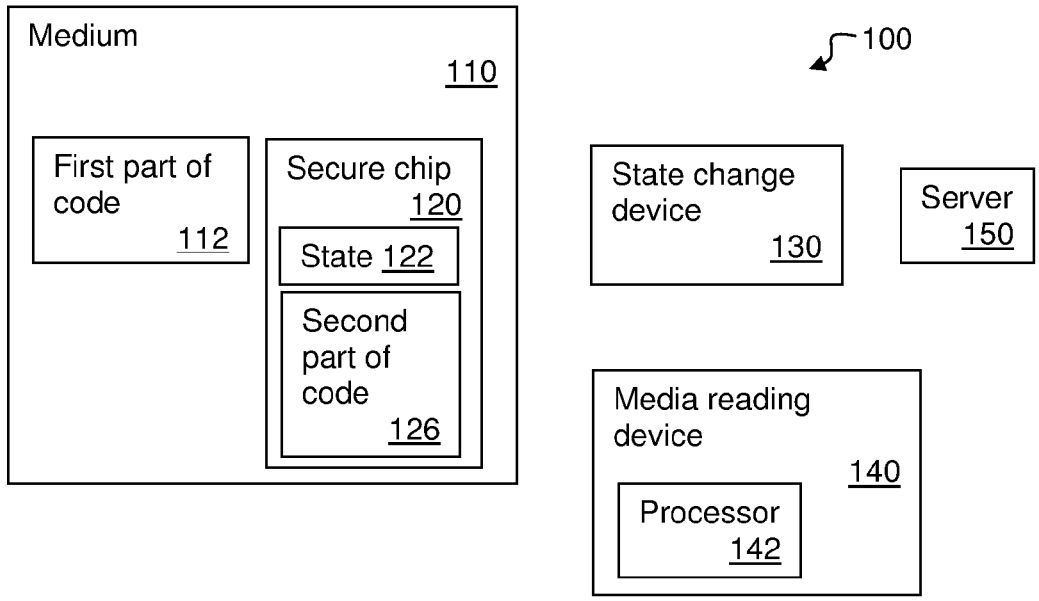
FIG. 1 illustrates the general inventive concept of a copy protection system of the present invention.

FIG. 1 illustrates the general inventive concept of a copy protection system of the present invention. The system 100 comprises a medium 110 on which is stored a first part 112 of a program code. The system 100 further comprises a secure chip 120, which is an active component able to perform cryptographic calculations and to execute programs.

The secure chip 120 may be internal to the medium 110 (such as embedded in it) or external to the medium 110. Especially in the latter case is it preferred that the secure chip 120 is linked to the medium 110 in the sense that the secure chip 120 is usable only with that particular medium 110.

The secure chip 120 stores a state 122, and a second part 126 of the program code. The first part 112 and the second part 126 of the program code are adapted to interact so as to execute the program code.

The system 100 also comprises at least one state change device 130, advantageously located in points of sale. The state change device 130 is adapted to communicate with the secure chip 120 in order to deactivate the anti-theft function by altering the state 122.

In addition, the system 100 comprises at least one media reading device 140, such as a personal computer or a dedicated game console, for interacting with the media, by downloading and executing the first part 112 of the program code in its processor 142. The media reading device 140 is thus adapted to read the first part 112 of the program code stored on the medium 110, to communicate with the secure chip 120, and to execute the first part 112 of the program code.

Furthermore, the system may comprise a, possibly remote, server 150 adapted to communicate with and authenticate state change devices 130 located in points of sale as will be further described hereinafter.

When leaving the manufacturer's site, the state 122 of the secure chip 120 is preferably set to a state called $ANTI_{13}$ THEFT, which means that the medium is not fully usable or accessible by a media reading device. When a customer purchases the medium 110 (or at another suitable time), the state 122 of the secure chip is changed to ACTIVE, using a state change device 130 and any suitable prior art method. However, in addition to the known methods, the secure chip 120 authenticates the state change device 130 and changes its state 122 only upon successful authentication. It is advantageous that the state ANTI_THEFT further is adapted to interact with anti-theft portals or the like at a point of sale, so as to set of an alarm in case the secure chip 120 passes through an anti-theft portal in the ANTI_THEFT state (but not in the ACTIVE state).

When the customer uses the program code, access to at least some of the second part 126 of the program code is needed, which means that the media reading device 140 requires the medium 110 to be inserted or otherwise made accessible for reading. However, as the processor 142 is not able to use the entire program code directly, the first part 112 of the program code is designed to communicate with the secure chip 120 in order to have functions of the second part 126 of the program code executed by the secure chip 120. If the state 122 of the secure chip 120 is equal to ACTIVE, then the secure chip 120 executes at least one function of the second part 126 of the program code and, depending on the executed function, returns a result and/or further data, or simply returns a message that indicates that the processor 142 may resume execution of the first part 112 of the program code. If the state 122 is not equal to ACTIVE (such as for example if it is ANTI-THEFT), then the secure chip 120 preferably returns no information, but it is also possible for it to return a random value. As the execution of the program code needs the correct information to run correctly, the execution of the program code goes in a deteriorated mode or fails if the secure chip does not execute the necessary functions correctly.

In an alternate embodiment, the interaction between the secure chip 120 and the state change device 130 is more complex. The state change device 130 is connected to a remote server 150. Once the secure chip 120 has authenticated the state change device 130, the latter requests from the server 150 (or, if the server is a database, searches for) information specific to the secure chip 120. The information is transmitted securely to the secure chip 120 that uses it to complete the second part 126 of the program code. While this alternate embodiment is more complex, it has the advantage that the impact of the theft of a state change device 130 is limited, as it is possible to revoke the state change device 130 so that the server (or database) 150 refuses to return any information to it. It should further be noted that each medium (or batch of media) may have a specific serial number or identifier and that the data returned from the remote server 150 is specific for the medium (or batch of media). The state change device 130, that in a sense directly or indirectly functions as a validation centre, may for example also be a device that simply allows the secure chip 120 and the server 150 communicate with each other; in other words, the state change device is transparent.

It is advantageous that the server 150, before returning any information specific to the secure chip 120, checks if the secure chip 120 is listed on a special list (a revocation list), e.g. if it has been reported as stolen or if it for any other reason should not be usable. In this case, the server 150 refuses to provide the necessary information to the state change device 130. An advantage of this is that it e.g. is possible to make sure that a stolen batch may not be sold easily.

DETAILS ABOUT THE PREFERRED EMBODIMENT

In a preferred embodiment, the invention is directed to a system for computer programs stored on a medium. In the preferred embodiment, the medium 110 is a Digital Versatile Disc (DVD) and the secure chip 120 is a contact-less smart card embossed in the DVD.

Figure 2:
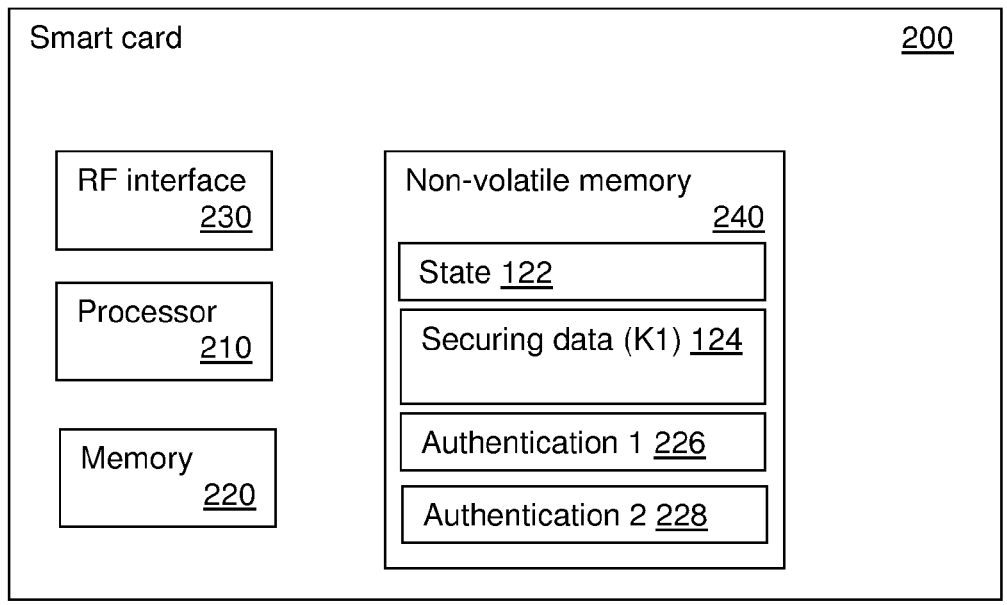
FIG. 2 illustrates a contact-less smart card according to a preferred embodiment of the invention.

FIG. 2 illustrates the contact-less smart card 200 of the preferred embodiment of the invention. The contact-less smart card 200 comprises:

A processing unit 210.

A Radio Frequency (RF) interface 230 for communication with the media reading device 140 and the state change device 130.

A memory 220, such as a volatile Random Access Memory (RAM).

A non-volatile memory 240 adapted to store at least the following data:
the state 122;
a second part 126 of the program code.
first authentication data 226 comprising a preferably unique Diffie-Hellman (DH) 1024-bit certified key pair ($K_{pub1}$, $K_{pri1}$) and a certificate for public key $K_{sign1}$ where:
$K_{pri1}$ is a DH-1024 private key. It is preferably unique for each smart card 200.
$K_{pub1}$ is the corresponding signed public key. The certificate of $K_{pub1}$ is been signed by the private key corresponding to $K_{sign1}$.
$K_{sign1}$ is common to all smart cards 200 and state change devices 130.
second authentication data 228 comprising a preferably unique DH 1024-bit certified key pair ($K_{pub2}$, $K_{pri2}$) and a certificate for public key $K_{sign2}$ where:
$K_{pri2}$ is a DH-1024 private key. It is preferably unique for each smart card 200.
$K_{pub2}$ is the corresponding signed public key. The certificate of $K_{pub2}$ is been signed by the private key corresponding to $K_{sign2}$.

$K_{sign2}$ is common to all smart cards 200 and media reading devices 140.

Figure 3:
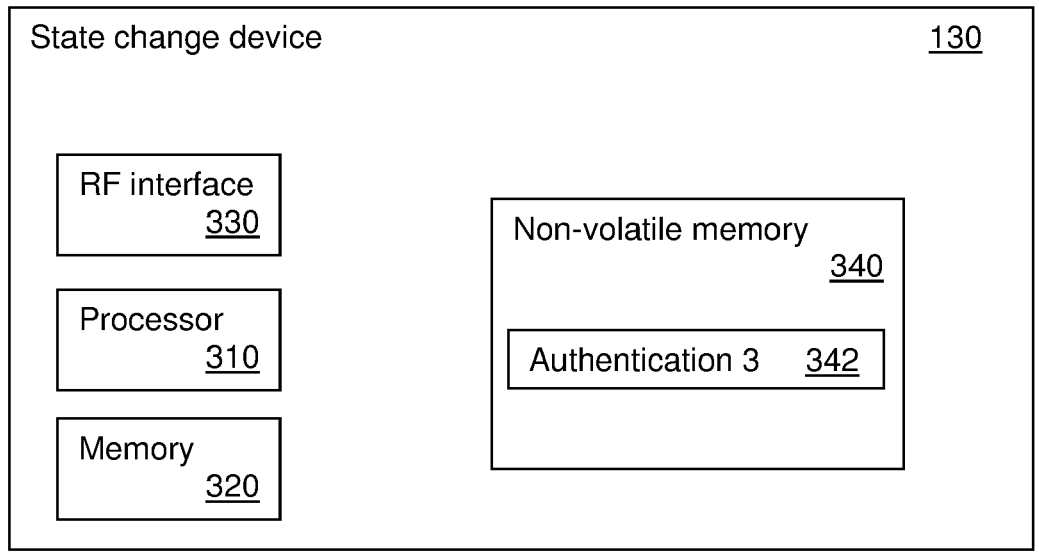
FIG. 3 illustrates a state change device according to the preferred embodiment of the invention.

A first computer programme adapted to execute the algorithms described hereafter FIG. 3 illustrates a state change device according to the preferred embodiment of the invention. The state change device 130 comprises:

A processing unit 310

A RF interface 330 adapted to communicate with the smart card 200.

A memory 320.

A non-volatile memory 340 adapted to store:

Third authentication data 342, which is a preferably unique DH 1024-bit certified key pair ($K_{pub3}$, $K_{pri3}$) and a certificate for public key $K_{sign1}$ where:

$K_{pri3}$ is a DH-1024 private key, preferably unique for each state change device 130.

$K_{pub3}$ is the corresponding signed public key. The certificate of $K_{pub3}$ is signed by the private key corresponding to $K_{sign1}$.

$K_{sign1}$ is common to all smart cards 200 and state change devices 130.

Figure 4:
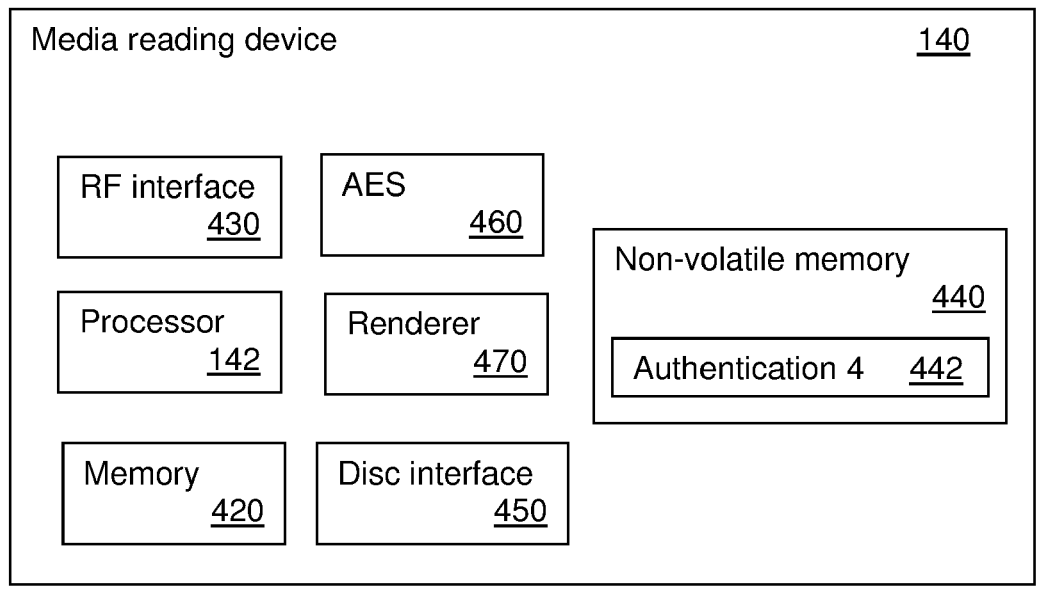
FIG. 4 illustrates a media reading device according to the preferred embodiment of the invention.

A second computer programme adapted to execute the algorithms described hereafter FIG. 4 illustrates a media reading device according to the preferred embodiment of the invention. The media reading device 140 comprises:

A processing unit 142

A RF interface 430 adapted to communicate with the smart card 200.

A memory 420

A non-volatile memory 440 adapted to store:

Fourth authentication data 442, which is a preferably unique DH 1024-bit certified key pair ($K_{pub4}$, $K_{pri4}$) and a certificate for public key $K_{sign2}$ where:

$K_{pri4}$ is a DH-1024 private key, preferably unique for each media reading device 140.

$K_{pub4}$ is the corresponding signed public key. The certificate of $K_{pub4}$ is signed by the private key corresponding to $K_{sign2}$.

$K_{sign2}$ is common to all smart cards 200 and media reading devices 140.

A third computer programme adapted to execute the algorithms described hereafter A DVD interface to read the first part 112 of the program code from the medium 110.

When leaving the factory, state 122 of each smart card 200 is set to value ANTI_THEFT. Upon purchase of a medium, a state change device 130 is used to change the state 122 as follows. The processing unit 310 of the state change device 130 and the processing unit 210 of the smart card 200 communicate through their respective RF interfaces 330, 230 and attempt to perform an authenticated Diffie-Hellman protocol using the first authentication data 226 and the third authentication data 342. The processor 210 of the smart card 200 verifies that the certificate of the third authentication data 342 belongs to a state change device 130. If the authentication succeeds, then the state change device 130 sends to the smart card 200 a command to change state. Upon reception of the command, the smart card 200 changes its state 122 to ACTIVE. If the authentication fails, the smart card 200 refuses to execute any command issued by change state device 130.

Figure 5:
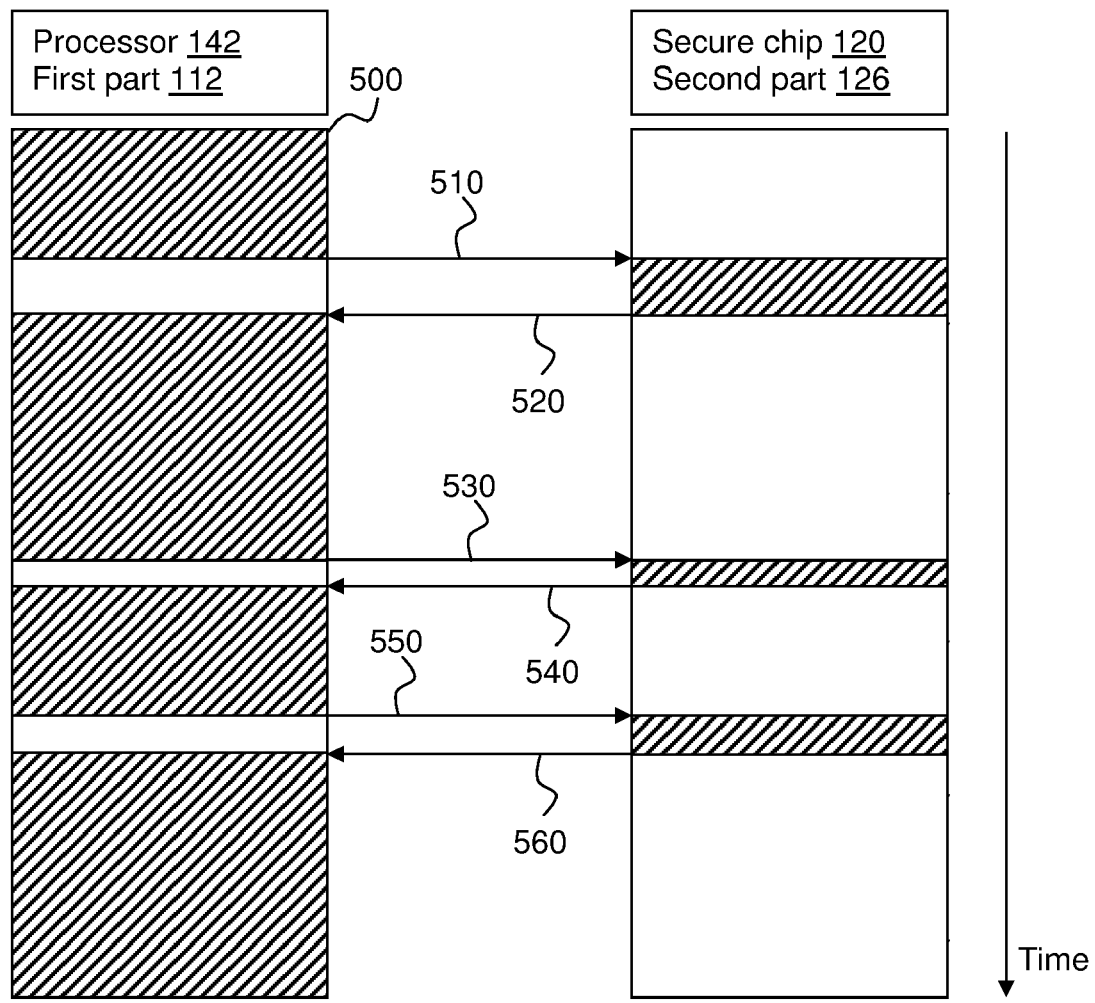
FIG. 5 illustrates a method for playing content on the medium according to the preferred embodiment of the invention.

FIG. 5 illustrates a method for executing the program code by executing the first part 112 in the processor 142 and the second part in the secure chip 120. Execution of the program code begins at 500 with execution of the first part 112 in the processor 142. At 510 the processor 142 communicates with the secure chip 120 to hand over execution. The secure chip 120 then executes at least one function of the second part 126 and hands over execution at 520. Similar exchanges occur at reference numbers 530, 540, 550, and 560. The messages sent to hand over execution may comprise variables or other data.

As will be appreciated, the present invention enables protection of program code on a pre-recorded medium.

It will be understood that the present invention has been described purely by way of example. Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A media package storing program code, the media package comprising a medium storing a first part of the program code intended to be executed on a processor external to the media package, and a processing device storing a state and a second part of the program code, the first and the second parts of the program code being adapted to interact when executed so as to execute the program code, the processing device comprising:

a processor for verifying the state and for executing the second part of the program code if the verification of the state indicates that this is authorised;

a first interface for communication with the processor external to the media package; and a second interface adapted to interact with a state change device in order to set the state from a first state not authorising execution of second part of the program code to a second state authorising execution of second part of the program code;

wherein the second interface is a Radio Frequency interface adapted to, when the media package is in the first state, interact with at least one anti-theft portal.

2. The media package of claim 1, wherein the processing device further comprises means for authenticating the state change device.

3. The media package of claim 1, wherein the medium comprises the processing device.

4. A system comprising a media package of claim 1, a state change device, and a server adapted to authenticate the state change device, and wherein the state change device is adapted to change the state only upon successful authentication.

5. The system of claim 4, wherein the server is further adapted to, upon successful authentication, send the second part of the program code to the state change device for transfer to the processing device.

6. The system of claim 5, wherein the server is further adapted to verify if the processing device has been revoked before sending the second part of the program code.

* * * * *